United States Patent [19]

Kimura et al.

[11] Patent Number: 5,846,642
[45] Date of Patent: Dec. 8, 1998

[54] POLYESTER FILM FOR THERMAL LAMINATION

[75] Inventors: Masahiro Kimura, Otsu; Shiro Imai, Kyoto, both of Japan

[73] Assignee: Toray Industries, Inc., Japan

[21] Appl. No.: 484,768

[22] Filed: Jun. 7, 1995

[30] Foreign Application Priority Data

Jun. 24, 1994 [JP] Japan .................................. 6-143271

[51] Int. Cl.⁶ .......................... B32B 15/08; B32B 27/08; B32B 27/18; B32B 27/36
[52] U.S. Cl. ........................ 428/323; 428/35.8; 428/458; 428/480; 428/483; 525/88; 525/92 B; 525/92 F; 525/98; 525/165; 525/174; 525/177
[58] Field of Search ................... 428/35.8, 35.9, 428/323, 346, 347, 349, 458, 480, 483, 910; 525/63, 64, 88, 92, 93, 98, 165, 174, 177; 528/283, 302, 308.1, 308.6, 308

[56] References Cited

U.S. PATENT DOCUMENTS

| | | | |
|---|---|---|---|
| 4,148,956 | 4/1979 | Breitenfellner et al. | 428/156 |
| 4,172,859 | 10/1979 | Epstein | 428/402 |
| 4,362,775 | 12/1982 | Yabe et al. | 428/213 |
| 4,954,568 | 9/1990 | Gelles et al. | 525/92 |
| 5,059,460 | 10/1991 | Heyes et al. | 428/35.3 |
| 5,243,022 | 9/1993 | Kim et al. | 528/308.8 |
| 5,424,121 | 6/1995 | Murakami et al. | 428/337 |

FOREIGN PATENT DOCUMENTS

A-0 257 693   3/1988   European Pat. Off. .
A-0 625 539   11/1994  European Pat. Off. .

OTHER PUBLICATIONS

Whelan, Tony, *Polymer Technology Dictionary*, Chapman & Hall, London, pp. 418–419, 438–440, Jan. 1994.

*Primary Examiner*—Vivian Chen
*Attorney, Agent, or Firm*—Austin R. Miller

[57] ABSTRACT

A polyester film for thermal lamination, comprising: a polyester A of 140° to 245° C. in melting point mainly composed of ethylene terephthalate and/or ethylene isophthalate, a thermoplastic elastomer mixed at a ratio by weight of 81:19 to 98:2 with the elastomer comprising particles having a particle size ratio of 2 to 100 is excellent not only in formability but also in act resistance and taste property, and hence ideal for application on to the inner faces of packages, containers, etc.

26 Claims, No Drawings

POLYESTER FILM FOR THERMAL LAMINATION

FIELD OF THE INVENTION

The present invention relates to a polyester film for thermal lamination excellent not only in adhesiveness and formability but also impact resistance and taste property. In more detail, it relates to a polyester film for thermal lamination ideal for metallic cans produced by forming.

The thermal lamination of the film of the present invention means to laminate the film onto a substrate of a metallic or non-metallic (paper, plastic, fibrous, non-woven fabric, etc.) material, by continuously heating the substrate or film for bonding them together, to prepare a composite.

Above all, the lamination of a film onto a metallic sheet attracts more attention under the recent growth of metallic can production.

It has been widely practiced to coat metallic cans on their inner surfaces with a solution or dispersion obtained by dissolving or dispersing an epoxy or phenol or any other thermosetting resin into a solvent to cover the metallic surfaces for corrosion prevention. However, the coating with a thermosetting resin has such unpreferable problems as taking a long time to dry to lower the productivity, and causing environmental pollution by the organic solvent used in a large quantity.

As methods to solve the problems, a polyester film has been laminated onto a metallic sheet destined to be metallic cans, such as a steel sheet, aluminum sheet or any of these sheets treated on the surface by any of various methods such as plating, and the film-laminated metallic sheet is drawn, or drawn with ironing into metallic cans. The polyester film used in this way is required to have the following properties:

(1) To be excellent in adhesiveness to the metallic sheet.

(2) To be excellent in formability, and be free from such defects as pinholes after having been formed.

(3) Not to be peeled, cracked or pinholed by any impact against the metallic cans.

(4) Not to adsorb the fragrance ingredient of the content of the cans or not to impair the flavor of the content (hereinafter called the taste property).

To meet these requirements, many proposals have been made. For example, Japanese Patent Laid-Open (Kokai) No. 90-30527 discloses a polyester film with a specific planar orientation coefficient, and Japanese Patent Laid-Open (Kokai) No. 90-57339, a copolymerized polyester film with specific crystallinity. However, these proposals do not comprehensively satisfy the above diverse requirements, and it cannot be said that they sufficiently satisfy both formability and impact resistance, or the taste property. Especially in the drawing with ironing which draws the film to about 200–300%, the above proposed films cannot satisfy the requirements sufficiently.

Furthermore, in the case of thermal lamination to other materials, it is difficult to obtain composites which satisfy adhesiveness, impact resistance and taste property, and containers obtained by laminating an olefin polymer and paper have a problem of remarkably lowering the taste property.

SUMMARY OF THE INVENTION

An object of the present invention is to solve the problems of the above conventional techniques, by providing a polyester film for thermal lamination which is excellent in adhesiveness, formability, impact resistance and taste property. Another object is to provide a polyester film for thermal lamination, which is ideal for metallic cans produced by forming.

The objects of the present invention can be achieved by a polyester film for thermal lamination, comprising;

a polyester A mainly composed of ethylene terephthalate and/or ethylene isophthalate of 140° to 245° C. in melting point, and a thermoplastic elastomer mixed at a ratio by weight of 81:19 to 98:2.

DETAILED DESCRIPTION OF THE INVENTION

The polyester A in the present invention must have ethylene terephthalate and/or ethylene isophthalate as a main component to prevent the adsorption of the fragrance ingredient of the content. It refers to a polyester, not less than 70 mol % of which is composed of ethylene terephthalate and/or ethylene isophthalate. If the ethylene terephthalate and/or ethylene isophthalate content is less than 70 mol %, the adsorption of the fragrance ingredient cannot be perfectly prevented, and heat resistance, formability, etc. are lowered. The polyester can contain other copolymer components so long as the intended properties are not impaired. The dicarboxylic acid component can be selected, for example, from aromatic dicarboxylic acids such as naphthalenedicarboxylic acid, diphenyldicarboxylic acid, diphenylsulfonedicarboxylic acid, diphenoxyethanedicarboxylic acid, 5-sodiumsulfoisophthalic acid and phthalic acid, aliphatic dicarboxylic acids such as oxalic acid, succinic acid, adipic acid, sebacic acid, dimer acid, maleic acid and fumaric acid, alicyclic dicarboxylic acids such as cyclohexynedicarboxylic acid, hydroxycarboxylic acids such as p-hydroxybenzoic acid. On the other hand, the glycol component can be selected, for example, from aliphatic glycols such as propanediol, butanediol, pentanediol, hexanediol and neopentyl glycol, alicyclic glycols such as cyclohexanedimethanol, aromatic glycols such as bisphenol A and bisphenol S, diethylene glycol, polyalkylene glycols, etc.

Respectively two or more of these carboxylic acid components and glycol components can also be used together.

As far as the effect of the present invention is not impaired, the copolymerized polyester can also have a polyfunctional compound such as trimellitic acid, trimesic acid or trimethylolpropane copolymerized.

Diethylene glycol is generated as a byproduct in the production of the polyester A, and it is preferable that diethylene glycol is contained by 0.01 to 1.0 wt %, more preferably 0.01 to 0.8 wt %, further more preferably 0.01 to 0.6 wt % based on the weight of the polyester A, for preventing the decrease of molecular weight caused by the heat history of 200° C. or higher during can production. If the diethylene glycol content is less than 0.01%, the polymerization is complicated unpreferably in view of cost. If more than 1 wt %, the heat history during can production deteriorates the polyester, to lower the impact resistance of the film. Diethylene glycol is byproduced in the production of the polyester. The diethylene glycol content can be kept at 1 wt % or less by, though not limited to, shortening the polymerization time, or limiting the amount of the antimony compound or germanium compound, etc. used as a polymerization catalyst, or combining liquid phase polymerization and solid phase polymerization, or adding an alkali metal such as sodium or potassium by 1 to 200 ppm into the polymerization system, etc.

The polyester A used in the present invention must be 140° to 245° C. in melting point, to obtain the intended heat resistance and the sufficient adhesiveness to the metallic sheet, and to inhibit the decomposition of the thermoplastic elastomer during its mixing. Preferable polyesters include copolymerized polymers such as polyethylene terephthalate copolymerized with isophthalic acid, and polyethylene terephthalate copolymerized with butanediol and isophthalic acid, and polyesters obtained by copolymerizing a polyoxyethylene glycol such as diethylene glycol or polyethylene glycol with any of said polyesters.

Furthermore, in the present invention for better impact resistance and taste property, the intrinsic viscosity [η] of the polyester is recommended to be preferably 0.7 or more, more preferably 0.8 or more, further more preferably 0.85 or more. If the intrinsic viscosity is higher, it can be considered that the molecules are liable to be more intertwined with each other, to improve impact resistance and to lessen the chance of adsorbing the fragrance ingredient.

The intrinsic viscosity [η] in this case is obtained by measuring the relative viscosity of the polyester dissolved in o-chlorophenol at 25° C.

It is also preferable for better taste property that the acetaldehyde content of the polyester is kept at 40 ppm or less, more preferably 30 ppm or less, further more preferably 20 ppm or less. If the acetaldehyde content is more than 40 ppm, the taste property is poor. The method for keeping the acetaldehyde content of the film at 40 ppm or less is not especially limited. For example, the acetaldehyde generated by thermal decomposition when the polyester is produced by polycondensation reaction can be removed by heat-treating the polyester at a temperature lower than the melting point of the polyester under reduced pressure or in inactive gas atmosphere. Other methods include the solid phase polymerization of the polyester at a temperature higher than 150° C. and lower than the melting point under reduced pressure or inactive gas atmosphere, melt film forming using a vent type extruder, the melt extruding of the polyester in a short time at an extrusion temperature within melting point +40° C., preferably within melting point +30° C., etc. These methods are effective also for obtaining a film high in intrinsic viscosity.

Moreover, to obtain a film high in intrinsic viscosity, the water content of the polyester chips is recommended to be kept at preferably 100 ppm or less, more preferably 50 ppm or less, further more preferably 30 ppm or less.

The polyester of the present invention is recommended to be preferably 1 to 500 ppm, more preferably 5 to 300 ppm, further more preferably 10 to 100 ppm in germanium content in view of taste property. If the germanium content is less than 1 ppm, the effect of improving the taste property is not sufficient, and if more than 500 ppm, the polyester contains foreign matter, to be lowered in impact resistance and taste property. The polyester of the present invention can be improved in taste property by containing germanium by any amount in said specified range. The method for letting the polyester contain germanium is not especially limited. Usually it is preferable to add a germanium compound as a polymerization catalyst in any optional step before the production of the polyester is completed. This can be achieved, for example, by adding a germanium compound as a powder, or dissolving a germanium compound into the glycol component used as a starting raw material of the polyester, for adding as a solution as described in Japanese Patent Publication (Kokoku) No. 79-22234. The germanium compound can be selected, for example, from germanium dioxide, crystal water-containing germanium hydroxide, germanium alkoxides such as germanium tetramethoxide, germanium tetraethoxide, germanium tetrabutoxide, and germanium ethylene glycoxide, germanium phenoxides such as germanium phenolate, and germanium b-naphtholate, phosphorus-containing germanium compounds such as germanium phosphate, and germanium phosphate, germanium acetate, etc. Above all, germanium dioxide is preferable.

Furthermore, it is preferable for the impact resistance and taste property of the polyester film of the present invention, that the amount of the carboxyl end groups in the film is 35 equivalents/ton or less. It is especially preferable for film recoverability and impact resistance, that the amount of carboxyl end groups is 30 equivalents/ton or less. Concretely it is preferable to decrease the amount of carboxyl end groups in the raw material of the polyester by solid phase polymerization or any conventional end blocking agent such as carbodiimide or oxazoline, etc. to a predetermined amount, for extrusion at a low temperature in a short time.

On the other hand, increasing the amount of carboxyl end groups in the surface portion by surface treatment, etc. is preferable for enhancing adhesiveness.

Moreover, in view of the taste property, the oligomer content of the polyester of the present invention is recommended to be preferably 0.8 wt % or less, more preferably 0.7 wt % or less, further more preferably 0.6 wt % or less. If the oligomer content of the copolymerized polyester is more than 0.8 wt %, the taste property is poor. The method for keeping the oligomer content in the polyester at 0.8 wt % or less is not especially limited, but any method similar to any of the above mentioned methods for decreasing the aldehyde content of the copolymerized polyester can be adopted.

The method for producing the polyester of the present invention can be any conventional method and is not especially limited. As an example, copolymerizing isophthalic acid with polyethylene terephthalate, with germanium dioxide added as a germanium compound is described below. Terephthalic acid and isophthalic acid are interesterified or esterified with ethylene glycol, and subsequently germanium dioxide is added. The mixture is subjected to polycondensation reaction at a high temperature under reduced pressure till the diethylene glycol content reaches a certain level. In this case, direct polymerization substantially without the use of any ester interchange catalyst such as a magnesium-containing compound or manganese-containing compound is preferable since the film obtained has good taste performance. The polymer obtained is subjected to solid phase polymerization reaction at a temperature lower than the melting point of the polymer under reduced pressure or inactive gas atmosphere, to decrease the acetaldehyde content, and to achieve the predetermined intrinsic viscosity [η] and the desired amount of carboxyl end groups.

In the present invention, as a result of intensive study, it was found that if a layer containing a specific amount of a dispersed thermoplastic elastomer in addition to said polyester A (hereinafter called the layer A) is formed, a film for thermal lamination excellent in both impact resistance and taste property can be obtained.

The thermoplastic elastomer in the present invention can be plasticized at high temperatures and molded like plastics. It is a polymer consisting of a rubber component having the properties of a rubbery resilient material to exhibit entropy resiliency at room temperature (soft segment) and a confining component to allow flow at high temperatures but to inhibit plastic deformation at room temperature (hard segment). It is recommended to be preferably 1–5000 kgf/cm$^2$ in tensile elastic modulus and 10–90 JIS A in hardness. The thermoplastic elastomer of the present invention is not especially limited, but can be selected from polystyrene based elastomers (consisting of polystyrene as the hard segment and polybutadiene, polyisoprene, hydrogenated polybutadiene or ethylene-propylene copolymer rubber, etc. as the soft segment), polyolefin based elastomers (consisting of polyethylene or polypropylene as the hard segment and ethylene-propylene copolymer rubber, polybutadiene, polyisoprene or hydrogenated polybutadiene, etc. as the soft segment), polyester based elastomers (consisting of a polyester as the hard segment and a polyether or polyester as the soft segment), polyamide based elastomers (consisting of a polyamide as the hard segment and a polyether or polyester as the soft segment), and an elastomer consisting of syndiotactic-1,2-polybutadiene as the hard segment and atactic-1,2-polybutadiene as the soft segment, etc.

Furthermore, the above thermoplastic elastomers can have any known functional groups and functional group forming components such as hydroxyl groups, carboxyl groups, epoxy groups, amido groups and maleic anhydride component, etc. partially introduced. Among them, polystyrene based elastomers and polyester based elastomers are preferable for better impact resistance and taste property. Concretely, polystyrene based elastomers such as SBS (styrene-butadiene-styrene copolymer), SEBS (styrene-ethylene/butylene-styrene copolymer), SIS (styrene-isoprene-styrene copolymer), and SEP (styrene-ethylene/propylene copolymer), and polyester based elastomers such as HYTREL (produced by Toray Du Pont), ARNITEL (produced by Akzo Chemie), Perprene (produced by Toyobo), and LOMOD (produced by General Electric) can be preferably used. Especially SEBS is preferable since the film for thermal lamination obtained is improved in impact resistance without being impaired in taste property even at a low content.

On the other hand, ionomer based elastomers tend to lower the taste property since the metallic component increases.

The thermoplastic elastomer is recommended to be preferably 0.1 to 50 g/10 min, more preferably 0.5 to 30 g/10 min, further more preferably 1 to 20 g/10 min in melt index at 210° C. at a load of 2160 g in view of the melt extrudability with the polyester.

Moreover, it is preferable to add a known compatibility enhancing agent into the polyester-thermoplastic elastomer mixture layer, since higher compatibility assures higher impact resistance.

In the present invention, to keep both impact resistance and taste performance good, it is necessary that the polyester A and the thermoplastic elastomer are mixed at a ratio by weight of 81:19 to 98:2, preferably 85:15 to 97:3. This ratio merely means the ratio of the polyester A the thermoplastic polymer, and, as a matter of course, the polyester film of this invention may include other component(s) as long as it does not substantially interfere with the effects of the present invention. Letting a polyester contain a proper amount of a thermoplastic elastomer considered to be excellent in flexibility even at low temperatures like this can keep the impact resistance high, even after experiencing the heat history of can production.

Furthermore, in the present invention, it is preferable for achieving higher impact resistance that the average particle size of the thermoplastic elastomer dispersed in the polyester A is 0.02 to 5 $\mu$m.

Moreover, in the present invention, it was found that if the particle size ratio (the average particle size in the longitudinal direction/the average particle size in the thickness direction) of the thermoplastic elastomer dispersed in the polyester A is 2 to 100, impact resistance is especially good. Furthermore, if the particle size ratio is 4 to 50, especially the retort dent resistance is preferably improved. To measure the particle size ratio of the dispersed thermoplastic elastomer, for example, the film is cut to show its sections, for preparing very thin slices of about 0.1 to 1 $\mu$m in thickness, and their photographs are taken at a magnification of about 500 to 20,000 using a transmission electron microscope (10 photos of 25 cm in longitudinal direction×20 cm in thickness direction), to measure the dimension in the longitudinal direction (xi), the dimension in the thickness direction (yi) and the ellipse equivalent area (Si) of each particle (i) of the thermoplastic elastomer dispersed in the polyester. Then, the average particle size in the longitudinal direction (x av) and the average particle size in the thickness direction (y av) are obtained using the following equations for the respective directions, and the particle size ratio (=x av/y av) is obtained.

$$x\ av = \Sigma xi \cdot Si / \Sigma Si$$

$$y\ av = \Sigma Yi \cdot Si / \Sigma Si$$

The method for keeping the particle size ratio at 2 to 100 is not especially limited. For example, this can be achieved by using a screw with a mixing structure to give higher shear force for higher kneadability, such as Dalmage screw, Unimelt screw, pin screw, BM screw, wave screw, HM screw, DIS screw or multiple pin screw, etc. or by using a two-spindle extruder for extrusion, or a two-spindle extruder with screw dimensions suitable for kneading (for example, a portion for retaining the polymer for some long time is formed to allow kneading by a rotor formed to give high kneadability, etc.).

On the other hand, for flaw resistance during can production and the possible adsorption of the ordor ingredient of the content, it is preferable to laminate to the layer a layer A composed of a polyester B with ethylene terephthalate of 220° to 260° C. in melting point as a main component, in addition to said layer A. The polyester B is recommended to contain preferably 70 mol % or more of ethylene terephthalate. If the melting point is lower than 220° C., the heat resistance of the cans is insufficient. A small amount of a thermoplastic elastomer can also be added to the layer B to achieve higher impact resistance, so long as the taste property is not impaired.

Furthermore, if the difference in melting point between the polyesters A and B is 35° C. or less, preferably 30° C. or less, more preferably 25° C. or less, the difference in thermal expansion and contraction between the layers A and B during heat history in can production is preferably small for higher workability.

Both the layers may be different in chemical composition, catalyst, the amount of diethylene glycol and the amount of carboxyl end groups. If the edges of the polyester film of the present invention are recovered for re-use, they are recommended to be contained preferably in the layer A for taste property.

If the polyester film of the present invention is used on the inner surface of a can, the ratio of thickness of the layer A to the layer B is recommended to be preferably 20:1 to 1:1 in view of taste property and impact resistance, more preferably 15:1 to 4:1 in view of impact resistance.

The thickness of the polyester film of the present invention is recommended to be preferably 5 to 50 µm, more preferably 8 to 45 µm, further more preferably 10 to 40 µm in view of the can formability after lamination on the metal, film formability on the metal, impact resistance and taste property.

The polyester film of the present invention is recommended to be preferably 0.001 to 1 µm, preferably 0.005 to 0.5 µm, further more preferably 0.01 to 0.1 µm in the average roughness Ra at least on one side of the film, in view of handling convenience and high speed lamination. Furthermore, if the ratio of maximum roughness Rt to average roughness Ra, Rt/Ra is preferably 3 to 60, more preferably 5 to 50, further more preferably 5 to 30, defects such as pinholes are hard to occur in the film during forming into cans, and in addition, high speed lamination can be smoothly effected.

To obtain a polyester film with the above surface properties, it is preferable for it to contain 0.001 to 10 wt % of inorganic grains and/or organic grains of 0.01 to 10 µm in average grain size, and to prevent the grains coming off from the film, it is more preferable to provide 0.005 to 3 wt % of inorganic grains and/or organic grains of 0.1 to 5 µm in average grain size. The inorganic grains and/or organic grains can be selected, for example, from inorganic grains of wet and dry silica, colloidal silica, titanium oxide, calcium carbonate, calcium phosphate, barium sulfate, alumina, mica, kaolin, clay, etc. and organic grains with styrene, divinylbenzene, silicone, acrylic acid, polyesters, etc. as components, etc. Among them, inorganic grains of silica, calcium carbonate, etc. and organic grains with styrene, silicone, acrylic acid, methacrylic acid, polyester, divinylbenzene, etc. as components are preferable. Two or more kinds of these inorganic and organic grains can also be used together.

If grains of more than 10 µm in average grain size are used, the film is liable to have defects, and especially if grains of more than 30 µm are used, the properties are greatly worsened. So, it is preferable to use a filter capable of substantially removing foreign matter of more than 30 µm in film formation.

The average grain size in this case is obtained by the following method. From the surface of the film, the polymer is removed by plasma low temperature incineration treatment, to expose the grains which are observed by a scanning electron microscope (SEM), and the image of grains is processed by an image analyzer. At different places, more than 5,000 grains in total are observed, for the following numerical processing, to obtain the number average diameter D as the average grain size.

$$D = \Sigma D_i / N$$

where $D_i$ is the circle equivalent diameter of each grain, and N is the number of grains.

To prevent defects of the film due to the grains coming off during can forming, it is preferable to precipitate inside grains during the step of polymerization to obtain the polyester, for making the grains protrude on the surface of the film.

The method for precipitating the inside grains is not especially limited. For example, if a mixture containing an alkali metal compound or alkaline earth metal compound as an ester interchange catalyst is polymerized, the grains are precipitated in the reaction product. As another method, it is also possible to add terephthalic acid, etc. during ester interchange reaction or polycondensation reaction. As a further other method, an alkali metal compound or alkaline earth metal compound can be caused to exist in esterification reaction before or after completion of reaction, and polycondensation reaction can be effected in the presence of a phosphorus compound for precipitation. It is especially desirable in view of uniformness of grain sizes, that the ratio of the number of moles of the alkali metal compound (A) plus the number of moles of the alkaline earth metal compound (B) to the number of moles of the phosphorus compound (P), (B+0.5 A)/P is in a range from 0.5 to 5.

The amount of the inside grains is recommended to be preferably 0.01 to 2 wt %, and this amount can be obtained, for example, by the following method.

Three hundred grams of o-chlorophenol is added to 30 g of the polyester sample, and the mixture is stirred at 100° C. for 1 hour, to dissolve the polymer. Then, rotor RP30 is installed in an ultra-centrifuge, Model 40P produced by Hitachi, Ltd., and 30 cc of the above solution per one cell is injected. The speed is gradually raised to 30,000 rpm, and at the speed, the separation of grains is continued for one hour and terminated. Furthermore, the supernatant solution is removed, and the separated grains are secured. To the secured grains, o-chlorophenol of room temperature is added, and the mixture is homogeneously suspended and ultra-centrifuged. This is repeated till the melt peak of the polymer by DSC does not appear any more. The separated grains thus obtained are dried in vacuum at 120° C. for 16 hours, and weighed.

Other organic and/or inorganic grains can also be used together with the inside grains.

The grains can be contained in either the layer A or the layer B, but in view of handling convenience, it is preferable to let the layer A contain more grains. The ratio of the average grain size D (µm) to the thickness d (µm) of the layer B, i.e., D/d is recommended to be preferably 0.05 to 50, more preferably 0.1 to 10, and in view of better lubricability, a range from 0.5 to 5 is further more preferable.

If no grains are contained, it is preferable to roughen the surface of the film in such a way that when the polymer is melt-extruded and solidified on a drum, the film is pressed by air against the drum roughened on the surface by air knife casting, etc., to be quickly cooled and solidified.

The film made of a copolymerized polyester in the present invention can be a non-oriented sheet or a mono- or bi-axially oriented film.

For forming into cans by drawing with ironing, etc. where the formability of the film is important, a non-oriented sheet is preferable, and for an application accompanying the drawing with ironing, an oriented film of 0.01 to 0.13 in the value of planar orientation coefficient fn=(Nx+Ny)/2−Nz obtained from the refractive indexes in length direction, width direction and thickness direction (Nx, Ny and Nz) is preferable. Furthermore, the film can be slightly drawn to such an extent that the formability of the non-oriented film is not impaired, and for example, can be slightly drawn at least in one direction at higher than the glass transition temperature to achieve a refractive index in the thickness direction of 1.55 to 1.60, preferably 1.55 to 1.58.

Surface treatment such as corona discharge treatment for enhancing adhesiveness is preferable for further improving properties. In this case, the E value is recommended to be preferably 5 to 40, more preferably 10 to 35.

The polyester film of the present invention can be obtained by any conventional optional method. The film of the present invention can be prepared by, though not limited to, the following method.

Polyethylene terephthalate with 17.5 mol % of isophthalic acid copolymerized (0.84 in [η], 0.7 wt % in diethylene glycol content, and 215° C. in melting point) as the polyester A and SEBS (styrene-ethylene/butylene-styrene block copolymer) mixed at a ratio by weight of 90:10 are supplied into a two-screw vent type extruder, to be melted (the temperature of the extruder is set at the melting point of the polyester A+25° C.), while polyethylene terephthalate with 5 mol % of isophthalic acid copolymerized (0.90 in [η], 0.89 wt % in diethylene glycol content, and 240° C. in melting point) as the polyester B is supplied into another two-screw vent type extruder, to be melted (the temperature of the extruder is set at the melting point of the polyester B+25° C.). Then, they are laminated as two layers by a feed block, and discharged from an ordinary nozzle, and the two-layer film is cooled and solidified by a cooling drum roughened on the surface, being wholly or partially pressed by air, with the polyester B layer in contact with the drum face, to obtain a cast film. The two-layer laminate film thus obtained is, as required, heat-aged, treated to be activated on the surface, and wound. Treating the film to be dust-proof is preferable since the film becomes less liable to have defects.

Furthermore, the cast polyester film can also be simultaneously or sequentially biaxially oriented. In the case of sequential biaxial orientation, drawing twice or more in the longitudinal direction or the transversal direction can also be effected. The drawing ratios in the longitudinal and transversal directions of the film can be optionally set, depending on the orientation degree, strength, elastic modulus, etc. of the film, but is recommended to be preferably 2.0 to 4.0 times in the respective directions. Either of the drawing ratios in the longitudinal and transversal directions can be larger, or both the ratios can also be equal. The drawing temperature can be optionally set as long as it is higher than the glass transition temperature and lower than the crystallization temperature of the polyester, but is usually recommended to be preferably 80° to 150° C.

Furthermore, after completion of biaxial drawing, the film can also be heat-treated. The heat treatment can be effected by any conventional optional method, for example, by a heated roll in an oven. The heat treatment temperature can be any optional temperature higher than the crystallization temperature of the polyester and lower than 260° C., preferably 120° to 240° C., more preferably 150° to 240° C. The heat treatment time is also optional, but is usually recommended to be preferably 1 to 60 seconds. The heat treatment can also be effected with the film relaxed in the longitudinal direction and/or in the transversal direction.

Moreover, in the production of the polyester film of the present invention, as required, additives such as antioxidant, plasticizer, antistatic agent, weather resistance improver, and end blocking agent can be used as the case may be.

The polyester film for thermal lamination of the present invention is excellent in formability, adhesiveness, impact resistance and taste property as described before, and can be easily thermally laminated on to not only metallic substrates but also various other substrates such as paper sheets, plastic sheets, fibers and non-woven fabrics for ideal use as containers and other products.

On the other hand, if the polyester film of the present invention is laminated on to a metallic sheet substrate, to obtain a laminated metal sheet which is, then, formed into metallic cans by drawing or drawing with ironing, the metallic cans can be ideally used as negative pressure cans and positive pressure cans since a metal is used as the substrate. Especially when a steel sheet, aluminum sheet or any of these sheets treated on the surface is used as the substrate to be laminated with the polyester film, the metallic sheet can be easily formed and the cans obtained is preferably excellent in impact resistance.

The metal of the present invention is not especially limited, but in view of formability, can be preferably a metal mainly composed of iron or aluminum, etc. In the case of a metallic sheet mainly made of iron, it can be covered on the surface with an inorganic oxide layer to enhance adhesiveness and corrosion resistance, for example, a chemical conversion coating by chromic acid treatment, phosphate treatment, chromic acid/phosphate treatment, electrolytic chromic acid treatment, chromate treatment or chromium chromate treatment, etc. Especially chromium oxide hydrate of 6.5 to 150 mg/m$^2$ in terms of metal chromium is preferable, and furthermore, an extendible metal plating layer of, for example, nickel, tin, zinc, aluminum, gun metal or brass, etc. can also be formed. In the case of tin plating, the preferable amount of plating is 0.5 to 15 g/m$^2$, and in the case of nickel or aluminum, 1.8 to 20 g/m$^2$.

Methods for measuring and evaluating properties in the present invention are described below.
(1) Diethylene glycol content of polyester
    Measured by NMR (13C-NMR spectrum).
(2) Melting point of polyester
    Crystallized polyester chips or film is measured by a differential scanning calorimeter (Model DSC-2 produced by Parkin Elmer) at a temperature rise rate of 10° C./min.
(3) Intrinsic viscosity of polyester
    The polymer is dissolved into o-chlorophenol, and the relative viscosity is measured at 25° C.
    To measure the intrinsic viscosities of the respective layers of a laminated film, the respective layers are separated by cutting using a knife and measured (it is also possible to wash the material remaining after cutting by a solvent such as o-chlorophenol, and to measure it).
(4) Germanium element content of polyester
    Determined from the germanium element content of the polyester composition obtained by fluorescent X-ray measurement and from the calibration curve of peak intensities.
(5) Acetaldehyde content
    Two grams of polyester film fine powder is put into a pressure vessel together with ion exchange water, and subjected to extraction with water at 120° C. for 60 minutes, and a highly sensitive gas chromatograph is used for determination.
(6) Amount of carboxyl end groups (equivalents/ton)
    The polyester is dissolved into o-cresol/chloroform (7/3 by weight) at 90° to 100° C. for 20 minutes, and potentiometric titration is effected using an alkali.
(7) Oligomer content
    One hundred milligrams of the polyester film is dissolved into 1 ml of orthochlorophenol, and a liquid chromatograph (Model 8500 produced by Varian) is used to measure the cyclic trimer as the amount of oligomer.
(8) Average grain size
    The thermoplastic resin is removed from the surface of the film by plasma low temperature incineration treatment, to expose the grains. The heat treatment conditions are selected to incinerate the thermoplastic resin but not to damage the grains. The grains are observed by a scanning electron microscope (SEM), and the image of the grains is processed by an image analyzer. The observation is made at different places, and more than 5,000 grains are numerically processed. The number average diameter D obtained from the following formula is adopted as the average grain size.

$$D=\Sigma Di/N$$

where Di is the circle equivalent diameter of a grain, and N is the number of grains.

In the case of inside grains, sections of the film can also be observed by a transmission microscope.

(9) Particle size ratio of dispersed thermoplastic elastomer

The polymer is cut, to obtain about 0.1 to 1 µm thick slices of sections which are photographed (10 sheets of 25 cm in longitudinal direction and 20 cm in thickness direction) at a magnification of about 5,000 to 20,000 using a transmission electron microscope, to measure the diameter in the longitudinal direction (xi), the diameter in the thickness direction (yi) and the ellipse equivalent area (Si) of each grain (i) of the thermoplastic elastomer dispersed in the polyester A. Then, the following formulae for the respective directions are used to obtain the average particle size in the longitudinal direction (x av) and the average particle size in the thickness direction (y av), for obtaining the particle size ratio (=x av/y av).

$$x\ av = \Sigma xi \cdot Si / \Sigma Si$$

$$y\ av = \Sigma Yi \cdot Si / \Sigma Si$$

(10) Planar orientation coefficient and refractive indexes

With sodium D ray (wavelength 589 nm) as the light source, an Abbe's refractometer is used for measurement. The planar orientation coefficient $fn=(Nx+Ny)/2-Nz$ is obtained by calculation from the refractive indexes in the longitudinal direction, transversal direction and thickness direction (Nx, Ny and Nz).

(11) Film surface roughness (average roughness Ra and maximum roughness Rt)

The surface roughness of the film is measured using a surface roughness tester under the following conditions. The mean value of 20 measured values is adopted. The surface roughness tester used is a high precision thin film level difference measuring instrument ET-10 produced by Kosaka Kenkyuujo.

Probe tip radius: 0.5 µm

Probe load: 5 mg

Measuring length: 1 mm

Cutoff: 0.08 mm

Probe speed: 4 µm/second

The definitions of Rt and Ra are stated, for example, in Jiro Nara, "Methods for Measuring and Evaluating Surface Roughnesses (in Japanese)" (Sogo Gijutsu Center, 1983).

(12) Formability (Draw ironed cans)

The surface to be bonded, of the polyester film and a tin plated steel sheet are heated to 180° to 230° C., and they are laminated under pressurization, and formed using a draw ironing machine (at a forming ratio of 3.0 (maximum thickness/minimum thickness)), being followed by bottom forming, and baking at 220° C. for 10 minutes, to obtain draw ironed cans. Furthermore, the cans are charged with 1% sodium chloride aqueous solution, and a voltage of 6 V is applied between the electrode in the sodium chloride solution and the metallic can, to read the current value. The mean value of ten cans is adopted for judgment according to the following criterion.

(Drawn cans)

The surface to be bonded, of the polyester film and a TFS metallic sheet are heated to 200° to 240° C., and they are laminated under pressurization, and formed using a drawing machine (at a forming ratio of 1.3 (maximum thickness/minimum thickness)), being followed by bottom forming and baking at 215° C. for 1 minute, to obtain drawn cans. The cans are charged with 1% sodium chloride aqueous solution, and a voltage of 6 V is applied between the electrode in the sodium chloride solution and the metallic can, to read the current value. The mean value of ten cans is adopted for judgment according to the following criterion.

Grade A: Less than 0.05 mA

Grade B: 0.05 mA to less than 0.1 mA

Grade C: 0.1 mA to less than 0.3 mA

Grade D: 0.3 mA or more

(13) Impact resistance

After can production as stated above, the following impact resistance is measured, and the mean value of ten cans is adopted for judgment according to the following criterion.

(a) After completion of baking, the cans are filled with 350 ml of carbonated water, are allowed to stand at 5° C. for 24 hours, are allowed to drop on to concrete from a height of 1 m with the angle between the bottom face and the concrete face kept at 15 degrees, get the content removed, are masked with wax on the inside surface, and are filled with 1% sodium chloride aqueous solution, and a voltage of 6 V is applied between the electrode in the sodium chloride solution and the metallic can, to read the current value.

(b) After completion of baking, the cans are treated by a retort at 120° C. for 30 minutes, are filled with marketed oolong tea, are allowed to stand at 20° C. for 24 hours, are allowed to drop on to concrete from a height of 1 m with the angle between the bottom face and the concrete face kept at 15 degrees, get the content removed, are masked with wax on the inside surface, and are filled with 1% sodium chloride aqueous solution, and a voltage of 6 V is applied between the electrode in the sodium chloride solution and the metallic can, to read the current value.

Grade A: Less than 0.05 mA

Grade B: 0.05 mA to less than 0.1 mA

Grade C: 0.1 mA to less than 0.3 mA

Grade D: 0.3 mA or more

(14) Taste property (a) A can (6 cm in diameter and 12 cm in height) is filled with 350 ml of a perfume aqueous solution (20 ppm d-limonene aqueous solution), to immerse the film in it at 20° C. for 5 days, and the film is heated in nitrogen current at 80° C. for 30 minutes, to measure the expelled ingredient by gas chromatography for determining the amount of d-limonene adsorbed per 1 g of film, for evaluation on the taste property of the film.

(b) Furthermore, a can (6 cm in diameter and 12 cm in height) is filled with 350 ml of a perfume aqueous solution (20 ppm d-limonene aqueous solution), sealed, allowed to stand at 25° C. for 1 month, and opened, to evaluate the change in odor by a sensory test.

Grade A No change in odor occurred.

Grade B Little change in odor occurred.

Grade C Change in odor occurred.

The present invention is described below in reference to examples, but is not limited thereto or thereby.

EXAMPLE 1

Polyethylene terephthalate with 17.5 mol % of isophthalic acid copolymerized (with bis-b-hydroxyethyl terephthalate isophthalate copolymer retained by 50 vol %, isophthalic acid and ethylene glycol were gradually supplied with the molar ratio of the glycol component to the acid component kept at 1.6, and with stirring, the mixture was heated to 240°

C., to distill away almost the theoretical amount of water, then the reaction solution, being transfused into a reactor, and subsequently 0.15 wt % of trimethyl phosphate and germanium dioxide, being added, to obtain a polyester of $[\eta]$=0.68 in a relatively short time by direct polymerization, and solid phase polymerization was effected, to obtain the intended copolymer of 40 ppm in germanium element content, 0.87 in $[\eta]$, 0.92 wt % in diethylene glycol content, 213° C. in melting point, 8 ppm in acetaldehyde content and 18 equivalents/ton in the amount of carboxyl end groups) as the polyester A and SEBS (styrene-ethylene/butylene-styrene block copolymer of 3.0 g/10 min in MI and 30/70 in S/EB ratio) mixed at a ratio by weight of 90:10 were supplied into a two-screw vent type extruder (the temperature of the extruder was set at the melting point of the polyester A+25° C.), to be molten, while polyethylene terephthalate with 3 mol % of isophthalic acid copolymerized (ethylene glycol slurry containing 20 wt % of silicon oxide grains was added after completion of esterification reaction effected by the same direct polymerization as above, to obtain a polyester of $[\eta]$,=0.64, and solid phase polymerization was effected to obtain the intended copolymer of 42 ppm in germanium element content, 0.2 wt % in silicon oxide grain content, 0.90 in $[\eta]$, 0.89 wt % in diethylene glycol content, 240° C. in melting point, 6 ppm in acetaldehyde content, and 20 equivalents/ton in the amount of carboxyl end groups) as the polyester B was supplied into another two-screw vent type extruder (the temperature of the extruder was set at the melting point of the polyester B+25° C.), to be molten. Then, they were laminated as two layers (polyester A layer/polyester B layer=8/2) by a feed block and discharged from an ordinary nozzle, being wholly pressed by air, to be cooled and solidified by a cooling drum roughened on the surface (surface roughness 8 s), with the polyester A layer kept in contact with the drum face, to obtain a cast film. Furthermore, the polyester A layer was treated by corona discharge in air at 25° C. to achieve an E value of 20. The two-layer laminate film thus obtained got the polyester component dissolved in a solvent, to obtain the limiting viscosity which was found to be 0.81. The film was found to be 0.6 wt % in oligomer content, 18 ppm in acetaldehyde content, 21 equivalents/ton in the amount of carboxyl end groups, and 6.2 in dispersed elastomer particle size ratio. The physical properties, and the results of draw ironed cans obtained from a metallic sheet with the polyester A and B layers laminated are shown in Table 1. As can be seen, the film of the present invention containing a proper amount of a thermoplastic elastomer is excellent in impact resistance and taste property.

Films were obtained as done in Example 1, except that the kind of the thermoplastic elastomer, lamination ratio, the kinds of the polyesters, the kind of the metallic sheet, etc. were changed. The results are shown in Tables 1 to 4.

EXAMPLE 2

A film and metallic cans were obtained as done in Example 1, except that the ratio by weight of the polyester A to ethylene-propylene copolymer (3.5. g/10 min in melt index and 75/25 in E/P) was set at 90:10 and that polyethylene terephthalate (40 ppm in germanium element content, 0.90 in $[\eta]$, 0.80 wt % in diethylene glycol content, 253° C. in melting point and 16 equivalents/ton in the amount of carboxyl end groups) was used as the polyester B. As can be seen from Table 1, good properties were obtained even though the impact resistance was slightly lower.

EXAMPLE 3

A film and metallic cans were obtained as done in Example 1, except that polyethylene terephthalate with 12 mol % of isophthalic acid copolymerized (42 ppm in germanium element content, 0.85 in $[\eta]$, 0.70 wt % in diethylene glycol content, 227° C. in melting point and 14 equivalents/ton in the amount of carboxyl end groups) was used as the polyester A, that the ratio by weight was 93:7, and that the lamination ratio and the grains of the polyester B were changed. Good properties were obtained as shown in Table 1.

EXAMPLE 4

A film and metallic cans were obtained as done in Example 1, except that polyethylene terephthalate with 16 mole of isophthalic acid copolymerized (50 ppm in germanium element content, 0.80 in $[\eta]$, 1.5 wt % in diethylene glycol content, 218° C. in melting point and 20 equivalents/ton in the amount of carboxyl end groups) was used as the polyester A, and that the grains of the polyester B were changed. As shown in Table 2, good properties were obtained though the carbonated water dent resistance was rather lower.

EXAMPLE 5

A film and metallic cans were obtained as done in Example 1, except that the polyester A was 0.70 in limiting viscosity and 40 equivalents/ton in the amount of carboxyl end groups. As shown in Table 2, impact resistance was lower because of the lower limiting viscosity and more carboxyl end groups.

EXAMPLE 6

A film and cans were obtained as done in Example 1, except that 0.03 wt % of antimony was used as the polymerization catalyst of the polyester B and the diethylene content was 0.53%. The taste property was lower.

EXAMPLE 7

Polyethylene terephthalate with 14 mol % of isophthalic acid copolymerized (200 ppm in antimony element content, 0.73 in $[\eta]$, 0.50 wt % in diethylene glycol content, 225° C. in melting point and 31 equivalents/ton in the amount of carboxyl end groups, containing spherical colloidal silica) as the polyester A and SIS (3.0 g/10 in melt index and 20/80 in S/I) as the thermoplastic elastomer mixed at a ratio by weight of 90:10 destined to be the layer A and polyethylene terephthalate with 12 mol % of isophthalic acid copolymerized (42 ppm in germanium element content, 0.80 in $[\eta]$, 0.89 wt % in diethylene glycol content, 228° C. in melting point, and 25 equivalents/ton in the amount of carboxyl end groups, containing spherical colloidal silica) destined to be the layer B were co-extruded, and electrostatically cast on to a mirror-finished drum of 25° C. with the layer B kept in contact with the drum face. The raw film was drawn at 95° C. to 3.1 times in the longitudinal direction and then to at 105° C. to 3.1 times in the transversal direction. The biaxially oriented film was heat-treated at 200° C. for 7 seconds with the length kept constant, to obtain a 25 $\mu$m thick polyester film. The film obtained was 0.08 in planar orientation coefficient. The film used in drawn cans was good in impact resistance and taste property. On the other hand, the film used in draw ironed cans was Grade D in formability.

EXAMPLE 8

A film was obtained as done in Example 7, except that polyethylene terephthalate with 12 mol % of isophthalic acid copolymerized (200 ppm in antimony element content, 0.83 in [η], 0.50 wt % in diethylene glycol content, 229° C. in melting point, and 31 equivalents/ton in the amount of carboxyl end groups, containing spherical colloidal silica) as the polyester A and SEBS (styrene-ethylene/butylene-styrene block copolymer of 3.0 g/10 min in melt index and 30/70 in S/EB ratio) mixed at a ratio by weight of 90:10, and polyethylene terephthalate with 10 mol % of isophthalic acid copolymerized (after completion of esterification reaction by direct polymerization, ethylene glycol slurry containing 20 wt % of silicon oxide grains was added, to obtain a polyester of 0.64 in [η], and solid phase polymerization was effected, to obtain the intended copolymer of 42 ppm in germanium element content, 0.90 in [η], 0.89 wt % in diethylene glycol content, 232° C. in melting point, 6 ppm in acetaldehyde content, and 20 equivalents/ton in the amount of carboxyl end groups, containing spherical colloidal silica) were used, drawn to 2.0 times in the longitudinal direction and 2.0 times in the transversal direction, and heated-treated at 140°0 C. The film used in draw ironed cans was good in properties though rather low in impact resistance as shown in Table 3.

EXAMPLE 9

A film and metallic cans were obtained as done in Example 1, except that the lamination ratio was 1:2 (polyester A layer:polyester B layer). As shown in Table 3, formability and impact resistance were rather lower, because of the larger thickness of the polyester B layer and the ratio of the average grain size D ($\mu$m) to the thickness d ($\mu$m) of the layer B as small as D/d=0.03.

EXAMPLE 10

The polyester A was prepared by a conventional method of using dimethyl terephthalate and an ester interchange catalyst, and grains were caused to be contained inside (after completion of esterification reaction, lithium acetate was added to be contained by 0.2 wt %, and trimethyl phosphate ethylene glycol solution was added to have 0.17 wt % of trimethyl phosphate contained; furthermore, germanium oxide was added as a polymerization catalyst, and 0.11 wt % of calcium acetate was added). Moreover, after completion of film formation, the edges were crushed, to be recovered and the crushed material was mixed by 15% with the polyester A, for film formation. The improvement of formability surmised to be attributable to the effect of changing the grain system was observed, and other properties were also good.

Comparative Example 1

A film and metallic cans were obtained as done in Example 1, except that the melting point of the polyester and the amount of the elastomer added were changed, that a single-screw extruder was used, and that an aluminum sheet was used. As shown in Table 4, the formability and impact resistance were rather lower because of the large difference in melting point between the polyesters A and B and the smaller dispersed elastomer particle size ratio.

EXAMPLE 11

A polymer film of the following compositions for the inner face of a can and a white polymer film of the following compositions for the outer face of the can were thermally laminated on to the respective faces of a 0.2 mm thick TFS steel sheet, and quickly cooled, and the laminated sheet was drawn into cans. The cans were good in impact resistance and taste property as shown in Table 4, and the whiteness on the outer surface of the can was also good.

(Inner face of can) A film was formed as done in Example 7, except that the following compositions were heated-treated at 170° C.

Lamination side: Polyethylene terephthalate with 12 mol % of isophthalic acid copolymerized (42 ppm in germanium element content, 0.75 in [η], 0.80 wt % in diethylene glycol content, 228° C. in melting point, and 30 equivalents/ton in the amount of carboxyl end groups, containing spherical colloidal silica) and SEBS (styrene-ethylene/butylene-styrene block copolymer of 3.0 g/10 min in melt index and 30/70 in S/EB ratio) mixed at a ratio by weight of 90:10 (15 $\mu$m)

Non-lamination side: Polyethylene terephthalate with 10 mol % of isophthalic acid copolymerized (40 ppm in germanium element content, 0.74 [η], 0.89 wt % in diethylene glycol content, 233° C. in melting point, and 31 equivalents/ton in the amount of carboxyl end groups) (10 $\mu$m)

(Outer face of can) A film was formed as done in Example 7, except that the following compositions were heat-treated at 170° C.

Lamination side: Polyethylene terephthalate with 12 mol % of isophthalic acid copolymerized (42 ppm in germanium element content, 0.75 in [η], 0.80 wt % in diethylene glycol content, 228° C. in melting point, and 25 equivalents/ton in the amount of carboxyl end group) and SEBS (styrene-ethylene/butylene-styrene block copolymer of 3.0 g/10 min in melt index and 30/70 in S/EB ratio) mixed at a ratio by weight of 90:10 (5 $\mu$m).

Non-lamination side: Polyethylene terephthalate with 5 mol % of isophthalic acid copolymerized (40 ppm in germanium element content, 0.74 in [η], 0.89 wt % in diethylene glycol content, 240° C. in melting point, and 16 equivalents/ton in the amount of carboxyl end groups) and polyethylene terephthalate containing 70 wt % of titanium dioxide (0.3 $\mu$m in average grain size) (0.75 in [η] and 221° C. in melting point) mixed at a ratio by weight of 1:1 (15 $\mu$m)

Comparative Example 2

Polyethylene terephthalate with 12 mol % of isophthalic acid copolymerized (with magnesium acetate (170 ppm in magnesium element content) as the ester interchange catalyst, 350 ppm in antimony element content, 0.80 in [η], 2.0 wt % in diethylene glycol content, 227° C. in melting point, 17 ppm in acetaldehyde content, and 26 equivalents/ton in the amount of carboxyl end groups) was extruded at 290° C. by a single-screw extruder, to obtain a film. Results are shown in Table 5.

The film was poor in properties since it did not contain any thermoplastic elastomer.

Comparative Example 3

A film and metallic cans were obtained by using a single-screw extruder to extrude only a layer with 1 wt % of a thermoplastic elastomer added to the polyester A. The results are shown in Table 5. As can be seen from the table, impact resistance was very lower since the amount of the thermoplastic elastomer was too small.

Comparative Example 4

Polypropylene was used instead of the thermoplastic elastomer. The impact resistance and taste property were very lower.

INDUSTRIAL APPLICABILITY

The polyester film for thermal lamination of the present invention used to be thermally laminated on to a substrate is excellent in formability, adhesiveness, impact resistance and taste property, and can be ideally used on the inside surfaces of food packages and drinking containers. Especially a metallic sheet with the polyester film laminated on a metallic substrate can be ideally used for metallic cans produced by various forming processes.

Furthermore, even if the polyester film is laminated on to such a non-metallic substrate of paper, plastic, fibrous or non-woven fabric material, etc., it is unprecedentedly excellent in taste property, impact resistance and formability, and can be ideally used for containers, cans and other packages.

TABLE 1

|  |  |  | Example 1 | Example 2 | Example 3 |
|---|---|---|---|---|---|
| Physical properties of polymers | Layer A polymer | Polyester A | PET/I$^{17.5}$ | PET/I$^{17.5}$ | PET/I$^{12}$ |
|  |  | Ge (ppm) | 40 | 40 | 42 |
|  |  | [η] | 0.87 | 0.87 | 0.85 |
|  |  | DEG (wt %) | 0.92 | 0.92 | 0.70 |
|  |  | Melting point (°C.) | 213 | 213 | 227 |
|  |  | Thermoplastic elastomer | SEBS | EPR | SEBS |
|  |  | Ratio by weight (A: elastomer) | 90:10 | 90:10 | 93:7 |
|  |  | Grains, size (μ), amount (wt %) | — | — | — |
|  | Layer B polymer | Polyester B | PET/I$^3$ | PET | PET/I$^3$ |
|  |  | Ge (ppm) | 42 | 40 | 42 |
|  |  | [η] | 0.90 | 0.90 | 0.90 |
|  |  | DEG (wt %) | 0.89 | 0.80 | 0.89 |
|  |  | Melting point (°C.) | 240 | 253 | 240 |
|  |  | Grains, size (μ), amount (wt %) | SiO$_2$, 0.6, 0.1 | SiO$_2$, 0.6, 0.1 | SiO$_2$, 0.8, 0.1 |
| Properties of film and cans | | Thickness A/B (μm) | 24/6 | 24/6 | 27/3 |
|  |  | [η] | 0.81 | 0.80 | 0.81 |
|  |  | Amount of carboxyl groups (equivalents/ton) | 21 | 20 | 21 |
|  |  | AA (ppm) | 18 | 16 | 18 |
|  |  | Oligomer (wt %) | 0.60 | 0.54 | 0.47 |
|  |  | Dispersed elastomer particle size ratio (−) | 6.2 | 6.0 | 7.2 |
|  |  | Planar orientation coefficient (−) | 0.00 | 0.00 | 0.00 |
|  |  | Thickness direction refractive index (−) | 1.59 | 1.59 | 1.59 |
|  |  | Layer B Ra, Rt (μm) | 0.006, 0.087 | 0.009, 0.165 | 0.008, 0.110 |
|  |  | Formability | A | B | A |
|  |  | Impact resistance (carbonated water/retort) | A/A | B/B | A/A |
|  |  | Taste property |  |  |  |
|  |  | Amount of d-limonene adsorbed (μg/g) | 25 | 33 | 27 |
|  |  | Change in odor | A | A | A |

AA: Acetaldehyde
DEG: Diethylene glycol
PET/I: Polyethylene terephthalate with isophthalic acid copolymerized (the numeral indicates the mol % of the copolymerized ingredient)
SEBS: Styrene-ethylene/butylene-styrene block copolymer
EPR: Ethylene-propylene copolymer

TABLE 2

|  |  |  | Example 4 | Example 5 | Example 6 |
|---|---|---|---|---|---|
| Physical properties of polymers | Layer A polymer | Polyester A | PET/I$^{16}$ | PET/I$^{17.5}$ | PET/I$^{17.5}$ |
|  |  | Ge (ppm) | 50 | 40 | 42 |
|  |  | [η] | 0.80 | 0.70 | 0.87 |
|  |  | DEG (wt %) | 1.50 | 0.92 | 0.92 |
|  |  | Melting point (°C.) | 218 | 215 | 213 |
|  |  | Thermoplastic elastomer | SEBS | SEBS | SEBS |

TABLE 2-continued

|  |  |  | Example 4 | Example 5 | Example 6 |
|---|---|---|---|---|---|
|  |  | Ratio by weight (A: elastomer) | 90:10 | 90:10 | 90:10 |
|  |  | Grains, size ($\mu$), amount (wt %) | — | — | — |
|  | Layer B polymer | Polyester B | PET/I$^3$ | PET/I$^3$ | PET/I$^3$ |
|  |  | Ge (ppm) | 42 | 42 | — |
|  |  | [$\eta$] | 0.90 | 0.90 | 0.90 |
|  |  | DEG (wt %) | 0.89 | 0.89 | 0.53 |
|  |  | Melting point (°C.) | 240 | 240 | 241 |
|  |  | Grains, size ($\mu$), amount (wt %) | SiO$_2$, 0.4, 0.2 | SiO$_2$, 0.6, 0.1 | SiO$_2$, 0.6, 0.1 |
| Properties of film and cans | Thickness A/B ($\mu$m) |  | 24/6 | 24/6 | 24/6 |
|  | [$\eta$] |  | 0.77 | 0.68 | 0.81 |
|  | Amount of carboxyl groups (equivalents/ton) |  | 23 | 46 | 21 |
|  | AA (ppm) |  | 18 | 24 | 16 |
|  | Oligomer (wt %) |  | 0.64 | 0.69 | 0.58 |
|  | Dispersed elastomer particle size ratio (–) |  | 5.2 | 6.0 | 6.1 |
|  | Planar orientation coefficient (–) |  | 0.00 | 0.00 | 0.00 |
|  | Thickness direction refractive index (–) |  | 1.59 | 1.59 | 1.59 |
|  | Layer B Ra, Rt ($\mu$m) |  | 0.005, 0.079 | 0.006, 0.087 | 0.007, 0.095 |
|  | Formability |  | A | A | A |
|  | Impact resistance (carbonated water/retort) |  | B/A | B/B | A/A |
|  | Taste property |  |  |  |  |
|  | Amount of d-limonene adsorbed ($\mu$g/g) |  | 25 | 25 | 35 |
|  | Change in odor |  | A | A | A |

AA: Acetaldehyde
DEG: Diethylene glycol
PET/I: Polyethylene terephthalate with isophthalic acid copolymerized (the numeral indicates the mol % of the copolymerized ingredient)
SEBS: Styrene-ethylene/butylene-styrene block copolymer

TABLE 3

|  |  |  | Example 7 | Example 8 | Example 9 |
|---|---|---|---|---|---|
| Physical properties of polymers | Layer A polymer | Polyester A | PET/I$^{14}$ | PET/I$^{12}$ | PET/I$^{17.5}$ |
|  |  | Ge (ppm) | — | — | — |
|  |  | [$\eta$] | 0.73 | 0.83 | 0.87 |
|  |  | DEG (wt %) | 0.50 | 0.50 | 0.92 |
|  |  | Melting point (°C.) | 225 | 229 | 213 |
|  |  | Thermoplastic elastomer | SIS | SEBS | SEBS |
|  |  | Ratio by weight (A: elastomer) | 90:10 | 90:10 | 90:10 |
|  |  | Grains, size ($\mu$), amount (wt %) | SiO$_2$, 0.5, 0.2 | SiO$_2$, 0.6, 0.2 | — |
|  | Layer B polymer | Polyester B | PET/I$^{12}$ | PET/I$^{10}$ | PET/I$^3$ |
|  |  | Ge (ppm) | 42 | 42 | 42 |
|  |  | [$\eta$] | 0.80 | 0.90 | 0.90 |
|  |  | DEG (wt %) | 0.89 | 0.89 | 0.89 |
|  |  | Melting point (°C.) | 228 | 232 | 240 |
|  |  | Grains, size ($\mu$), amount (wt %) | SiO$_2$, 0.2, 0.2<br>SiO$_2$, 0.5, 0.02 | SiO$_2$, 0.3, 0.2<br>SiO$_2$, 0.6, 0.015 | SiO$_2$, 0.6, 0.1 |
| Properties of film and cans | Thickness A/B ($\mu$m) |  | 15/10 | 20/5 | 10/20 |
|  | [$\eta$] |  | 0.73 | 0.72 | 0.80 |
|  | Amount of carboxyl groups (equivalents/ton) |  | 39 | 38 | 21 |

TABLE 3-continued

|  | Example 7 | Example 8 | Example 9 |
|---|---|---|---|
| AA (ppm) | 12 | 11 | 15 |
| Oligomer (wt %) | 0.69 | 0.67 | 0.57 |
| Dispersed elastomer particle size ratio (–) | 4.2 | 3.9 | 6.1 |
| Planar orientation coefficient (–) | 0.08 | 0.02 | 0.00 |
| Thickness direction refractive index (–) | 1.53 | 1.56 | 1.59 |
| Layer B Ra, Rt ($\mu$m) | 0.006, 0.089 | 0.004, 0.067 | 0.006, 0.088 |
| Formability | B | A | B |
| Impact resistance (carbonated water/retort) | A/A | A/A | B/A |
| Taste property |  |  |  |
| Amount of d-limonene adsorbed ($\mu$g/g) | 18 | 22 | 22 |
| Change in odor | A | A | A |

AA: Acetaldehyde
DEG: Diethylene glycol
PET/I: Polyethylene terephthalate with isophthalic acid copolymerized (the numeral indicates the mol % of the copolymerized ingredient)
SEBS: Styrene-ethylene/butylene-styrene block copolymer
SIS: Styrene-isoprene copolymer

TABLE 4

|  |  |  | Example 10 | Comparative Example 1 | Example 11 |
|---|---|---|---|---|---|
| Physical properties of polymers | Layer A polymer | Polyester A | PET/I$^{17.5}$ | PET/I$^{20}$ | PET/I$^{12}$ |
|  |  | Ge (ppm) | 40 | 40 | 42 |
|  |  | [$\eta$] | 0.87 | 0.87 | 0.75 |
|  |  | DEG (wt %) | 0.92 | 0.95 | 0.80 |
|  |  | Melting point (°C.) | 213 | 204 | 228 |
|  |  | Thermoplastic elastomer | SEBS | SEBS | SEBS |
|  |  | Ratio by weight (A: elastomer) | 90:10 | 97.5:2.5 | 90:10 |
|  |  | Grains, size ($\mu$), amount (wt %) | Inside grains 1.3, 0.1 | — | SiO$^2$, 0.6, 0.1 |
|  | Layer B polymer | Polyester B | PET/I$^3$ | PET/I$^2$ | PET/I$^{10}$ |
|  |  | Ge (ppm) | 42 | 42 | 40 |
|  |  | [$\eta$] | 0.90 | 0.90 | 0.74 |
|  |  | DEG (wt %) | 0.89 | 0.89 | 0.89 |
|  |  | Melting point (°C.) | 240 | 245 | 233 |
|  |  | Grains, size ($\mu$), amount (wt %) | SiO$_2$,0.6,0.1 | SiO$_2$,0.6,0.1 | SiO$_2$,0.3,0.2 |
| Properties of film and cans | Thickness A/B ($\mu$m) |  | 24/6 | 24/6 | 20/5 |
|  | [$\eta$] |  | 0.79 | 0.81 | 0.71 |
|  | Amount of carboxyl groups (equivalents/ton) |  | 25 | 21 | 39 |
|  | AA (ppm) |  | 19 | 18 | 10 |
|  | Oligomer (wt %) |  | 0.63 | 0.60 | 0.57 |
|  | Dispersed elastomer particle size ratio (–) |  | 6.0 | 1.5 | 5.2 |
|  | Planar orientation coefficient (–) |  | 0.00 | 0.00 | 0.1 |
|  | Thickness direction refractive index (–) |  | 1.59 | 1.59 | 1.52 |
|  | Layer B Ra, Rt ($\mu$m) |  | 0.006, 0.087 | 0.006, 0.087 | 0.005, 0.080 |
|  | Formability |  | A | B | A |
|  | Impact resistance (carbonated water/retort) |  | A/A | B/B | A/A |

TABLE 4-continued

|  |  | Example 10 | Comparative Example 1 | Example 11 |
|---|---|---|---|---|
| | Taste property | | | |
| | Amount of d-limonene adsorbed ($\mu$g/g) | 25 | 25 | 20 |
| | Change in odor | A | A | A |

AA: Acetaldehyde
DEG: Diethylene glycol
PET/I: Polyethylene terephthalate with isophthalic acid copolymerized (the numeral indicates the mol % of the copolymerized ingredient)
SEBS: Styrene-ethylene/butylene-styrene block copolymer

TABLE 5

|  |  |  | Comp. Example 2 | Comp. Example 3 | Comp. Example 4 |
|---|---|---|---|---|---|
| Physical properties of polymers | Layer A polymer | Polyester A | PET/I$^{12}$ | PET/I$^{17.5}$ | PET/I$^{17.5}$ |
| | | Ge (ppm) | — | 40 | 40 |
| | | [$\eta$] | 0.80 | 0.80 | 0.87 |
| | | DEG (wt %) | 2.0 | 0.92 | 0.92 |
| | | Melting point (°C.) | 227 | 213 | 213 |
| | | Thermoplastic elastomer | — | EPR | PP |
| | | Ratio by weight (A: elastomer) | — | 99:1 | 95:5 |
| | | Grains, size ($\mu$), amount (wt %) | SiO$_2$, 0.6, 0.1 | SiO$_2$, 0.6, 0.1 | — |
| | Layer B polymer | Polyester B | — | — | PET/I3 |
| | | Ge (ppm) | — | — | 42 |
| | | [$\eta$] | — | — | 0.90 |
| | | DEG (wt %) | — | — | 0.89 |
| | | Melting point (°C.) | — | — | 240 |
| | | Grains, size ($\mu$), amount (wt %) | — | — | SiO$_2$, 0.6, 0.1 |
| Properties of film and cans | | Thickness A/B ($\mu$m) | 30/ | 30/ | 27/3 |
| | | [$\eta$] | 0.67 | 0.73 | 0.80 |
| | | Amount of carboxyl groups (equivalents/ton) | 41 | 40 | 23 |
| | | AA (ppm) | 32 | 26 | 19 |
| | | Oligomer (wt %) | 0.78 | 0.64 | 0.69 |
| | | Dispersed elastomer particle size ratio (–) | — | 2.0 | 2.2 |
| | | Planar orientation coefficient (–) | 0.00 | 0.00 | 0.00 |
| | | Thickness direction refractive index (–) | 1.58 | 1.59 | 1.59 |
| | | Layer B Ra, Rt ($\mu$m) | 0.006, 0.086 | 0.007, 0.091 | 0.006, 0.088 |
| | | Formability | B | A | B |
| | | Impact resistance (carbonated water/retort) | C/C | C/C | D/C |
| | Taste property | | | | |
| | | Amount of d-limonene adsorbed ($\mu$g/g) | 26 | 39 | 75 |
| | | Change in odor | B | A | B |

AA: Acetaldehyde
DEG: Diethylene glycol
PET/I: Polyethylene terephthalate with isophthalic acid copolymerized (the numeral indicates the mol % of the copolymerized ingredient)
PP: Polypropylene
EPR: Ethylene-propylene copolymer

We claim:

1. A polyester film for laminating onto a metallic sheet, comprising:
   a polyester A having a melting point of 140° to 245° C. comprising a polymer or copolymer of ethylene terephthalate and/or ethylene isophthalate, and a thermoplastic elastomer mixed and dispersed in polyester A at a ratio by weight of 81:19 to 98:2, said elastomer comprising particles having a particle size ratio of 2 to 100; wherein the particle size ratio is the ratio of the average particle size in the longitudinal direction to the average particle size in the thickness direction, and a second layer B laminated to said layer A and made of a polyester B composed mainly of ethylene terephthalate and having a melting point of 220° to 260° C.

2. The polyester film of claim 1 wherein the thermoplastic elastomer is a copolymer of polystyrene.

3. The polyester film of claim 2, wherein said copolymer of polystyrene comprises polystyrene as a hard segment and a soft segment selected from the group consisting of polybutadiene, polyisoprene, hydrogenated polybutadiene and ethylene-propylene copolymer rubber.

4. The polyester film according to claim 2, wherein the copolymer of polystyrene is selected from the group consisting of styrene-butadiene-styrene copolymer, styrene-ethylene/butylene-styrene copolymer, styrene-isoprene-styrene copolymer and styrene-ethylene/propylene copolymer.

5. The polyester film of claim 1 or 2, wherein the diethylene glycol content of the polyester A is 0.01 to 1 wt %.

6. The polyester film of claim 1, wherein the polyester A contains 1 to 500 ppm of germanium.

7. The polyester film of claim 1, wherein the difference in melting point between the polyesters A and B is 35° C. or less.

8. The polyester film of claim 1, wherein the layer B contains grains and wherein the ratio of average grain size D (μm) to thickness d (μm) of the layer B is D/d=0.05 to 50.

9. The polyester film of claim 1, wherein the intrinsic viscosity (η) of the polyester A is 0.7 or more.

10. The polyester film of claim 1, wherein the film is non-oriented.

11. The polyester film of claim 1, wherein the planar orientation coefficient is 0.01 to 0.13.

12. The polyester film of claim 1, wherein said thermoplastic elastomer is selected from the group consisting of polyolefin elastomers, polyester elastomers, polyamide elastomers, polystyrene elastomers and an elastomer consisting of syndiotactic-1,2-polybutadiene as a hard segment and atactic-1,2-polybutadiene as a soft segment.

13. The polyester film of claim 12, wherein said polyolefin elastomer comprises a hard segment selected from the group consisting of polyethylene and polypropylene and a soft segment selected from the group consisting of ethylene-propylene copolymer rubber, polybutadiene, polyisoprene and hydrogenated polybutadiene.

14. The polyester film of claim 12, wherein said polyester elastomer comprises a polyester hard segment and a soft segment selected from the group consisting of polyether and polyester.

15. The polyester film of claim 12, wherein said polyamide elastomer comprises a polyamide hard segment and a soft segment selected from the group consisting of polyether and polyester.

16. The polyester film of claim 1, wherein said thermoplastic elastomer is syndiotactic-1,2-polybutadiene as a hard segment and atactic-1,2-polybutadiene as a soft segment.

17. The polyester film of claim 1, wherein the thermoplastic elastomer is styrene-ethylene/butylene-styrene copolymer.

18. The polyester film according to claim 1, wherein the thermoplastic elastomer has a melt index of 1 to 20 g/10 min at 210° C. at a load of 2160 g.

19. The polyester film according to claim 18, wherein the thermoplastic elastomer comprises polyolefin elastomer.

20. The polyester film according to claim 1, wherein the thermoplastic elastomer has a functional group or a functional group forming component selected from the group consisting of hydroxyl groups, carboxyl groups, epoxy groups, amido groups and maleic anhydride.

21. The polyester film according to claim 1, wherein the amount of carboxyl end groups in the film are 35 equivalents/ton or less.

22. The polyester film according to claim 1, wherein the amount of carboxyl end groups in the film is 30 equivalents/ton or less.

23. The polyester film for thermal lamination of claim 1, wherein the thermoplastic elastomer is a polyester thermoplastic elastomer.

24. A polyester film metallic can liner comprising:

a polyester A having a melting point of 140° to 245° C. comprising a polymer or copolymer of ethylene terephthalate and/or ethylene isophthalate, and a thermoplastic elastomer mixed and dispersed in polyester A at a ratio by weight of 81:19 to 98:2, said elastomer comprising particles having a particle size ratio of 4 to 50, wherein the particle size ratio is the ratio of the average particle size in the longitudinal direction to the average particle size in the thickness direction, and a second layer B laminated to said layer A and made of a polyester B composed mainly of ethylene terephthalate and having a melting point of 220° to 260° C.

25. The polyester film according to claim 24, wherein the thermoplastic elastomer is selected from the group consisting of polystyrene elastomers, polyolefin elastomers and polyester elastomers.

26. A two-layer polyester film, a first layer which comprises (I) a polyester A having a melting point of 140° to 245° C. comprising a polymer or copolymer of ethylene terephthalate and/or ethylene isophthalate, and (II) a thermoplastic elastomer selected from the group consisting of styrene block copolymer and ethylene-propylene copolymer, said elastomer being mixed and dispersed in polyester A at a ratio by weight of 97.5:2.5 to 90:10 with said elastomer comprising particles having a particle size ratio of 2 to 100, wherein the particle size ratio is the ratio of the average particle size in the longitudinal direction to the average particle size in the thickness direction, and a second layer B laminated to said first layer A and comprising a polyester composed mainly of ethylene terephthalate and having a melting point of 220° to 260° C.

* * * * *

UNITED STATES PATENT AND TRADEMARK OFFICE
CERTIFICATE OF CORRECTION

PATENT NO. : 5,846,642
DATED : December 8, 1998
INVENTOR(S) : Kimura, et al.

It is certified that error appears in the above-identified patent and that said Letters Patent is hereby corrected as shown below:

In the Abstract, 3rd line up from bottom of paragraph, please change "act" to --impact--.

In Column 2, line 44, please change "As far" to --So long--.

In Column 5, line 57, after "polyester A" and before "the thermoplastic", please insert --to--.

In Column 14, line 12, please change "mole" to --mol%--.

Signed and Sealed this

Twenty-fourth Day of August, 1999

Attest:

Q. TODD DICKINSON

*Attesting Officer*　　　　*Acting Commissioner of Patents and Trademarks*